US010817565B2

(12) United States Patent
Farre Guiu et al.

(10) Patent No.: US 10,817,565 B2
(45) Date of Patent: Oct. 27, 2020

(54) AUTOMATION OF MEDIA CONTENT TAG SELECTION

(71) Applicant: Disney Enterprises, Inc., Burbank, CA (US)

(72) Inventors: Miquel Angel Farre Guiu, Bern (CH); Matthew Petrillo, Sandy Hook, CT (US); Monica Alfaro, Barcelona (ES); Pablo Beltran Sanchidrian, Barcelona (ES); Marc Junyent Martin, Barcelona (ES); Evan A. Binder, Calabasas, CA (US); Anthony M. Accardo, Los Angeles, CA (US); Katharine S. Ettinger, Santa Monica, CA (US); Avner Swerdlow, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 298 days.

(21) Appl. No.: 15/804,945

(22) Filed: Nov. 6, 2017

(65) Prior Publication Data
US 2019/0138617 A1    May 9, 2019

(51) Int. Cl.
*G06F 7/00*     (2006.01)
*G06F 16/78*    (2019.01)
*H04N 21/435*   (2011.01)
*H04N 21/44*    (2011.01)
*H04N 21/84*    (2011.01)
(Continued)

(52) U.S. Cl.
CPC ........ *G06F 16/7867* (2019.01); *G06F 16/738* (2019.01); *G06F 16/75* (2019.01); *G06F 16/9535* (2019.01); *H04N 21/435* (2013.01); *H04N 21/44* (2013.01); *H04N 21/84* (2013.01); *H04N 21/8405* (2013.01); *H04N 21/8456* (2013.01)

(58) Field of Classification Search
CPC ...... G06F 16/313; G06F 16/48; G06F 16/353; G06F 16/36; G06F 16/367; G06F 16/583
USPC .................. 707/715, 722, 817, 913–917
See application file for complete search history.

(56) References Cited

U.S. PATENT DOCUMENTS

| 8,543,582 | B1 * | 9/2013 | Granstrom | ............. | G06F 16/48 |
| | | | | | 707/748 |
| 8,626,491 | B2 * | 1/2014 | Gattani | ................ | G06F 40/295 |
| | | | | | 704/9 |

(Continued)

*Primary Examiner* — Daniel A Kuddus
(74) *Attorney, Agent, or Firm* — Farjami & Farjami LLP (57) ABSTRACT

A media content tagging system includes a computing platform having a hardware processor, and a system memory storing a tag selector software code configured to receive media content having segments, each segment including multiple content elements each associated with metadata tags having respective pre-computed confidence scores. For each content element, the tag selector software code assigns each of the metadata tags to at least one tag group, determines a confidence score for each tag group based on the pre-computed confidence scores of its assigned metadata tags, discards tag groups having less than a minimum number of assigned metadata tags, and filters the reduced number of tag groups based on the second confidence score to identify a further reduced number of tag groups. The tag selector software code then selects at least one representative tag group for a segment from among the further reduced number of tag groups.

18 Claims, 5 Drawing Sheets

(51) Int. Cl.
  *G06F 16/738* (2019.01)
  *G06F 16/9535* (2019.01)
  *H04N 21/8405* (2011.01)
  *H04N 21/845* (2011.01)
  *G06F 16/75* (2019.01)

(56) References Cited

U.S. PATENT DOCUMENTS

| | | | | |
|---|---|---|---|---|
| 8,688,435 | B2* | 4/2014 | Nasri | G06F 40/232 704/9 |
| 8,930,288 | B2* | 1/2015 | Toderici | G06K 9/6292 706/12 |
| 9,665,765 | B2* | 5/2017 | Barak | G06Q 50/01 |
| 2007/0079321 | A1* | 4/2007 | Ott, IV | H04N 21/84 725/18 |
| 2008/0040201 | A1* | 2/2008 | Hedlund | G06Q 30/00 705/7.32 |
| 2009/0240692 | A1* | 9/2009 | Barton | G06F 16/71 |
| 2012/0072845 | A1* | 3/2012 | John | G06F 16/48 715/738 |
| 2012/0123978 | A1* | 5/2012 | Toderice | G06K 9/00744 706/12 |
| 2013/0051670 | A1* | 2/2013 | Das | G06K 9/6212 382/170 |
| 2013/0268544 | A1* | 10/2013 | Nikankin | G06F 16/313 707/754 |
| 2016/0034451 | A1* | 2/2016 | Angelini, II | G06F 16/41 707/737 |
| 2016/0070954 | A1* | 3/2016 | Barak | G06F 3/04842 382/118 |
| 2016/0092959 | A1* | 3/2016 | Gross | G06K 9/00671 705/26.62 |
| 2016/0179805 | A1* | 6/2016 | Bolshinsky | G06F 16/248 707/723 |
| 2016/0179810 | A1* | 6/2016 | Bolshinsky | G06Q 50/01 707/723 |
| 2016/0259862 | A1* | 9/2016 | Navanageri | G06F 16/955 |
| 2017/0220601 | A1* | 8/2017 | Barak | G06K 9/00221 |

* cited by examiner

AUTOMATION OF MEDIA CONTENT TAG SELECTION

BACKGROUND

Media content in a wide variety of formats is consistently sought out and enjoyed by consumers. Video content, for example, is a popular medium for the enjoyment of entertainment content in the form of movies, television, and sports, as well as for information content such as news. Due to its popularity with consumers, ever more video content is being produced and made available for distribution. Consequently, the accuracy and efficiency with which video content can be classified and managed has become increasingly important to producers, owners, and distributors of such content.

Techniques for improving the accuracy with which media content can be classified have tended to apply metadata tags to the media content at ever finer levels of granularity. However, those techniques impose a heavy burden on human annotators tasked with reviewing the accuracy of the applied metadata tags.

SUMMARY

There are provided systems and methods for automating media content tag selection, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, media content in a wide variety of formats is consistently sought out and enjoyed by consumers. Video content, for example, is a popular medium for the enjoyment of entertainment content in the form of movies, television, and sports, as well as for information content such as news. Due to its popularity with consumers, ever more video content is being produced and made available for distribution. Consequently, the accuracy and efficiency with which video content can be classified and managed has become increasingly important to producers, owners, and distributors of such content.

As further stated above, techniques for improving the accuracy with which media content can be classified have tended to apply metadata tags to the media content at ever finer levels of granularity. However, those techniques undesirably impose a heavy burden on human annotators tasked with reviewing the accuracy of the applied metadata tags.

The present application discloses systems and methods for automating media content tag selection that address and overcome the deficiencies in the conventional art described above. By grouping metadata tags applied to finely grained elements of media content, and filtering the tag groups based on the individual confidence scores of their included metadata tags, the present solution improves the accuracy with which an automated approach to tagging can classify finely grained media content elements. Moreover, the present solution automates the selection of one or more tag groups associated with the media content elements included in a segment of media content having a coarser level of granularity than the elements as representative of the segment. Consequently, the present solution advantageously enables a human quality control annotator to evaluate the accuracy of metadata tags applied to media content at a high level of granularity based on review of selected metadata tags that are representative of the media content at a coarser level of granularity.

It is noted that, as used in the present application, the terms "automation," "automated", and "automating" refer to systems and processes that do not require the participation of a human user, such as a human editor or annotator. Although, in some implementations, a human editor or annotator may confirm or correct a metadata tag or tag category selected by the automated systems and according to the automated methods described herein, that human involvement is optional. Thus, the methods described in the present application may be performed under the control of hardware processing components of the disclosed automated systems.

Figure 1:
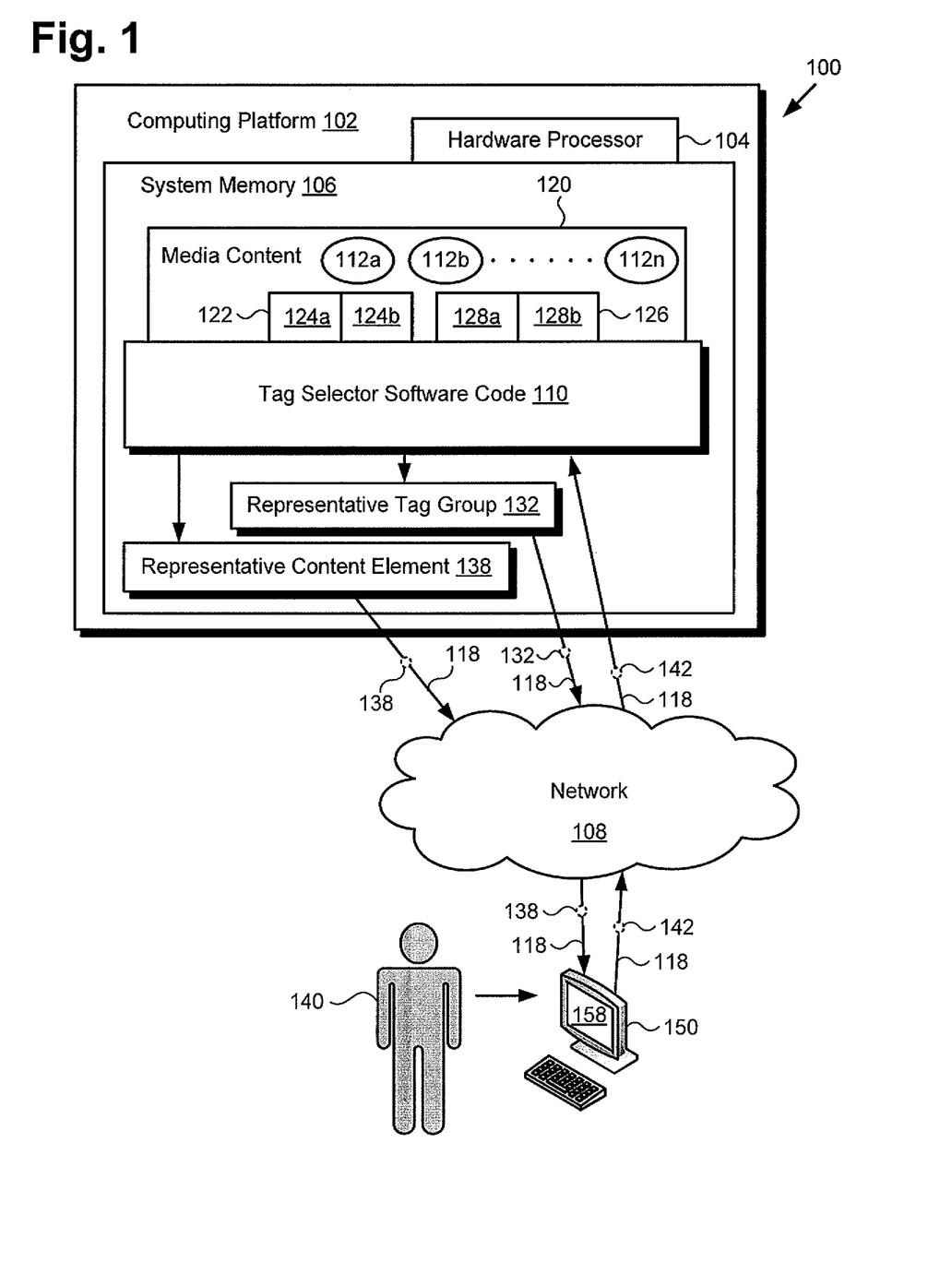
FIG. 1 shows an exemplary system for automating media content tag selection, according to one implementation.

FIG. 1 shows an exemplary system for automating media content tag selection, according to one implementation. As shown in FIG. 1, media content tagging system 100 includes computing platform 102 having hardware processor 104 and system memory 106 implemented as a non-transitory storage device. According to the present exemplary implementation, system memory 106 stores tag selector software code 110, as well as media content 120 including segments 122 and 126, each of which further include content elements. For example, segment 122 of media content 120 is shown to include content elements 124*a* and 124*b,* while segment 126 of media content 120 is shown to include content elements 128*a* and 128*b.* Also shown in FIG. 1 are metadata tags 112*a,* 112*b* . . . 112 *n* (hereinafter "metadata tags 112*a*-112*n*"), as well as representative tag group 132 and representative content element 138 of media content 120, each selected by tag selector software code 110.

As further shown in FIG. 1, media content tagging system 100 is implemented within a use environment including communication network 108, user system 150 including display 158, and editor or annotator 140 utilizing user system 150 and media content tagging system 100. In addition, FIG. 1 shows network communication links 118 of communication network 108 interactively connecting user system 150 with media content tagging system 100. Also shown in FIG. 1 is correction input 142 provided by user 140 in response to rendering of representative content element 138 on display 158 of user system 150.

It is noted that although FIG. 1 depicts tag selector software code 110 as being stored in its entirety in system memory 106, that representation is merely provided as an aid to conceptual clarity. More generally, media content tagging system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within media content tagging system 100.

According to the implementation shown by FIG. 1, user 140 may utilize user system 150 to interact with media content tagging system 100 over communication network 108. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of limited distribution network.

Although user system 150 is shown as a desktop computer in FIG. 1, that representation is also provided merely as an example. More generally, user system 150 may be any suitable mobile or stationary computing device or system that implements data processing capabilities sufficient to provide a user interface, support connections to communication network 108, and implement the functionality ascribed to user system 150 herein. For example, in other implementations, user system 150 may take the form of a laptop computer, tablet computer, or smartphone, for example. User 140, who may be an editor or annotator of media content 120, for example, may utilize user system 150 to interact with media content tagging system 100.

For example, representative tag group 132 may be selected by tag selector software code 110 of media content tagging system 100 in an automated process. Representative tag group 132 may be selected as representative of one of segments 122 or 126 of media content 120 based on an analysis of metadata tags 112a-112n applied to the content elements included in the respective one of segment 122 and 126. For example, where representative tag group 132 is selected as representative of segment 122 of media content 120, that selection may be based on analysis of a subset of metadata tags 112a-112 n applied to content elements 124a and 124b. Analogously, where representative tag group 132 is selected as representative of segment 126 of media content 120, that selection may be based on analysis of another subset of metadata tags 112a-112 n applied to content elements 128a and 128b.

Media content 120 may take a variety of forms. For instance, media content 120 may be video content, such as movie or TV news, sports, or dramatic programming content, music content, literary content, educational content, or programming code, to name a few examples. Segments 122 and 126 of media content 120, and content elements 124a, 124b, 128a, 128b may also take a variety of forms corresponding to the nature of media content 120. For example, where media content 120 is video content, segments 122 and 126 of media content 120 may be video clips or "shots" of video, while content elements 124a, 124b, 128a, 128b may each be an individual frame of video.

It is noted that, as used in the present application, a "shot" refers to a sequence of video frames that is captured from a unique camera perspective without cuts and/or other cinematic transitions. Thus, in one implementation, segment 122 of media content 120 may correspond to a single shot of video content including multiple content elements 124a and 124b in the form of individual frames of video. Similarly, segment 126 of media content 120 may correspond to a single shot of video content including multiple content elements 128a and 128b in the form of individual frames of video. However, in another implementation, segments 122 and 126 of media content 120 may be video clips, each including shots corresponding respectively to content elements 124a, 124b, 128a, and 128b.

It is emphasized that content elements 124a, 124b, 128a, and 128b are components of media content 120 having a relatively high level of granularity, while segments 122 and 126 are components of media content 120 having a coarser level of granularity than their included content elements 124a, 124b, 128a, and 128b. Furthermore, although segments 122 and 126 of media content 120 are each shown to include two media content elements, that representation is provided merely in the interests of conceptual clarity. More generally, each of segments 122 and 126 may include more, such as many more content elements than the two content elements depicted for each of segments 122 and 126 in FIG. 1.

It is further noted that, in various implementations, representative tag group 132 and/or representative content element 138, when selected using tag selector software code 110, may be stored in system memory 106 and/or may be copied to non-volatile storage (not shown in FIG. 1). Alternatively, or in addition, as shown in FIG. 1, in some implementations, representative tag group 132 and/or representative content element 138 may be transmitted to user system 150 including display 158, for example by being transferred via communication network 108. It is further noted that display 158 of user system 150 may take the form of a liquid crystal display (LCD), a light-emitting diode (LED) display, an organic light-emitting diode (OLED) display, or another suitable display screen that performs a physical transformation of signals to light.

Figure 2:
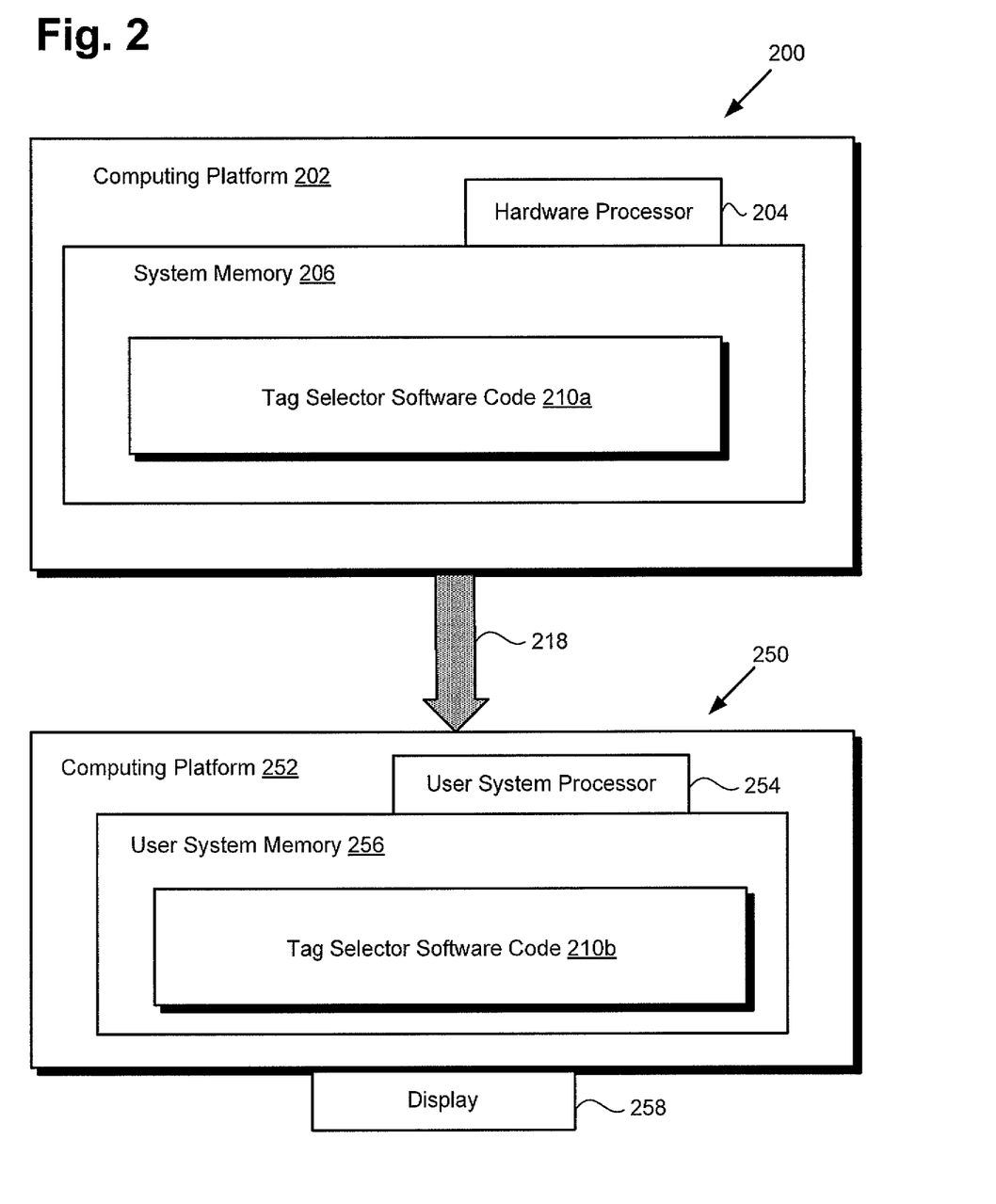
FIG. 2 shows an exemplary implementation in which a user system may be utilized as a system for automating media content tag selection.

FIG. 2 depicts an exemplary implementation in which user system 150 may be utilized as a system for automating media content tag selection. FIG. 2 shows media content tagging system 200 having computing platform 202 interactively connected to user system 250 via network communication link 218. Computing platform 202 includes hardware processor 204, and system memory 206 storing tag selector software code 210a. As further shown in FIG. 2, user system 250 includes user system hardware processor 254, user system memory 256 storing tag selector software code 210b, and display 258.

Media content tagging system 200 and network communication link 218 correspond respectively in general to media content tagging system 100 and any of network communication links 118, in FIG. 1. In addition, tag selector software code 210a and 210b, in FIG. 2, correspond in general to tag selector software code 110, in FIG. 1. In other words, tag selector software code 210a and 210b, and tag selector software code 110 may share the characteristics attributed to any of those corresponding features by the present disclosure.

Moreover, user system 250 and display 258 correspond respectively in general to user system 150 and display 158 in FIG. 1, and those respective corresponding features may share the characteristics attributed to any corresponding feature by the present disclosure. That is to say, although not shown as such in FIG. 1, user system 150 may include features corresponding respectively to computing platform 252, user system hardware processor 254, and user system memory 256 storing tag selector software code 210*b*.

According to the exemplary implementation shown in FIG. 2, tag selector software code 210*b* is located in user system memory 256, having been received from media content tagging system 200 via network communication link 218. In one implementation, network communication link 218 corresponds to transfer of tag selector software code 210*b* over a packet-switched network, such as the Internet, for example. Once transferred, for instance by being downloaded over network communication link 218, tag selector software code 210*b* may be persistently stored in user system memory 256 and may be executed locally on user system 250 by user system hardware processor 254. User system hardware processor 254 may be the central processing unit (CPU) for user system 250, for example, in which role user system hardware processor 254 runs the operating system for user system 250 and executes tag selector software code 210*b*.

Figure 3:
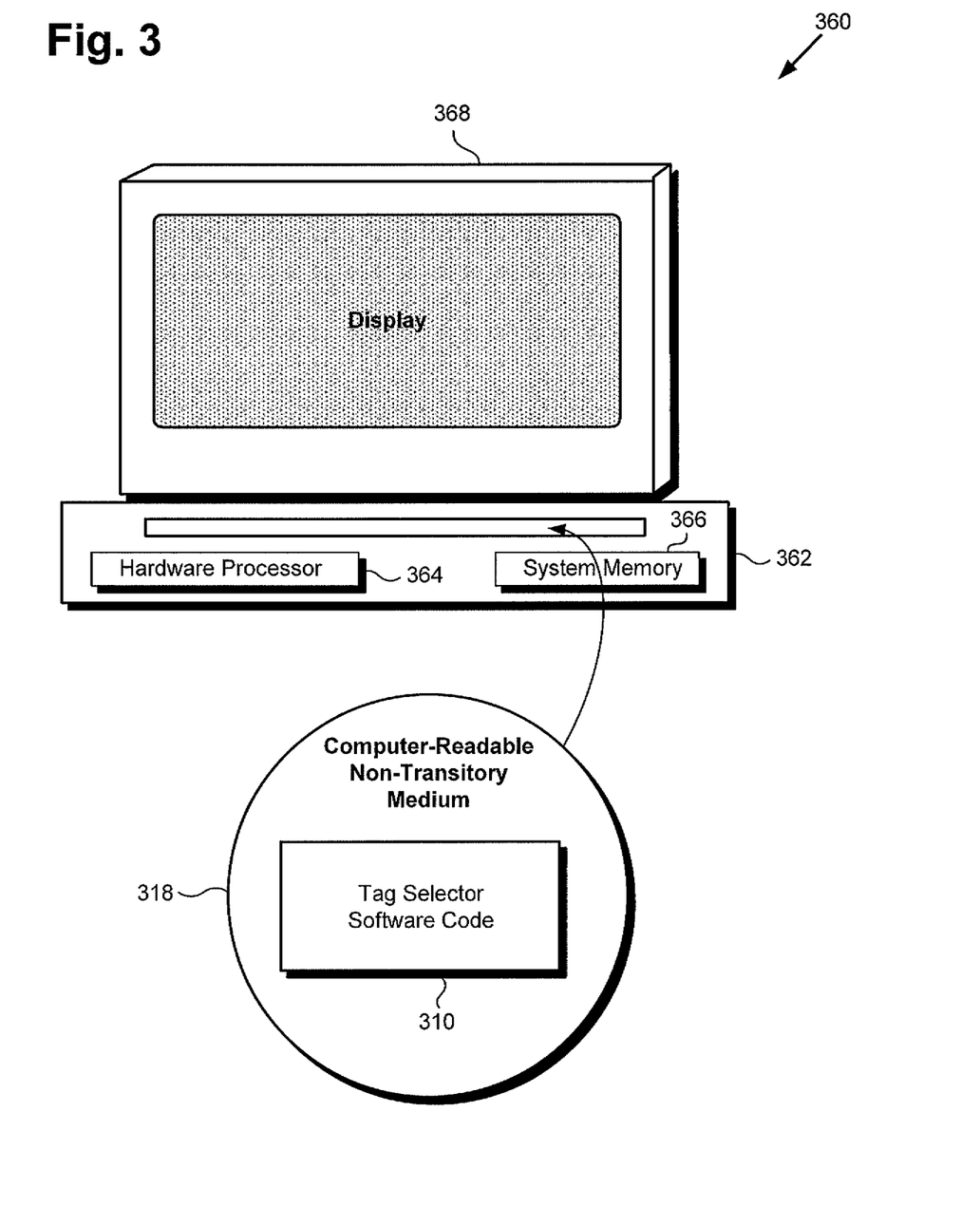
FIG. 3 shows an exemplary system and a computer-readable non-transitory medium including instructions enabling execution of a method for automating media content tag selection, according to one implementation.

FIG. 3 shows exemplary system 360 and computer-readable non-transitory medium 318 including instructions enabling execution of a method for automating media content tag selection, according to one implementation. System 360 includes computing platform 362 having hardware processor 364 and system memory 366, interactively linked to display 368. Display 368 may take the form of an LCD, LED display, OLED display, or another suitable display screen that performs a physical transformation of signals to light.

Also shown in FIG. 3 is computer-readable non-transitory medium 318 having tag selector software code 310 stored thereon. The expression "computer-readable non-transitory medium," as used in the present application, refers to any medium, excluding a carrier wave or other transitory signal, that provides instructions to hardware processor 364 of computing platform 362. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides tag selector software code 310 for execution by hardware processor 364 of computing platform 362. Tag selector software code 310 corresponds in general to tag selector software code 110/210*a*/210*b*, in FIGS. 1 and 2, and is capable of performing all of the operations attributed to those corresponding features by the present disclosure. In other words, in implementations in which hardware processor 364 of computing platform 362 accesses computer-readable non-transitory medium 318 and executes tag selector software code 310, system 360 may perform any of the actions attributed to media content tagging system 100/200 and user system 150/250 by the present disclosure.

Figure 4:
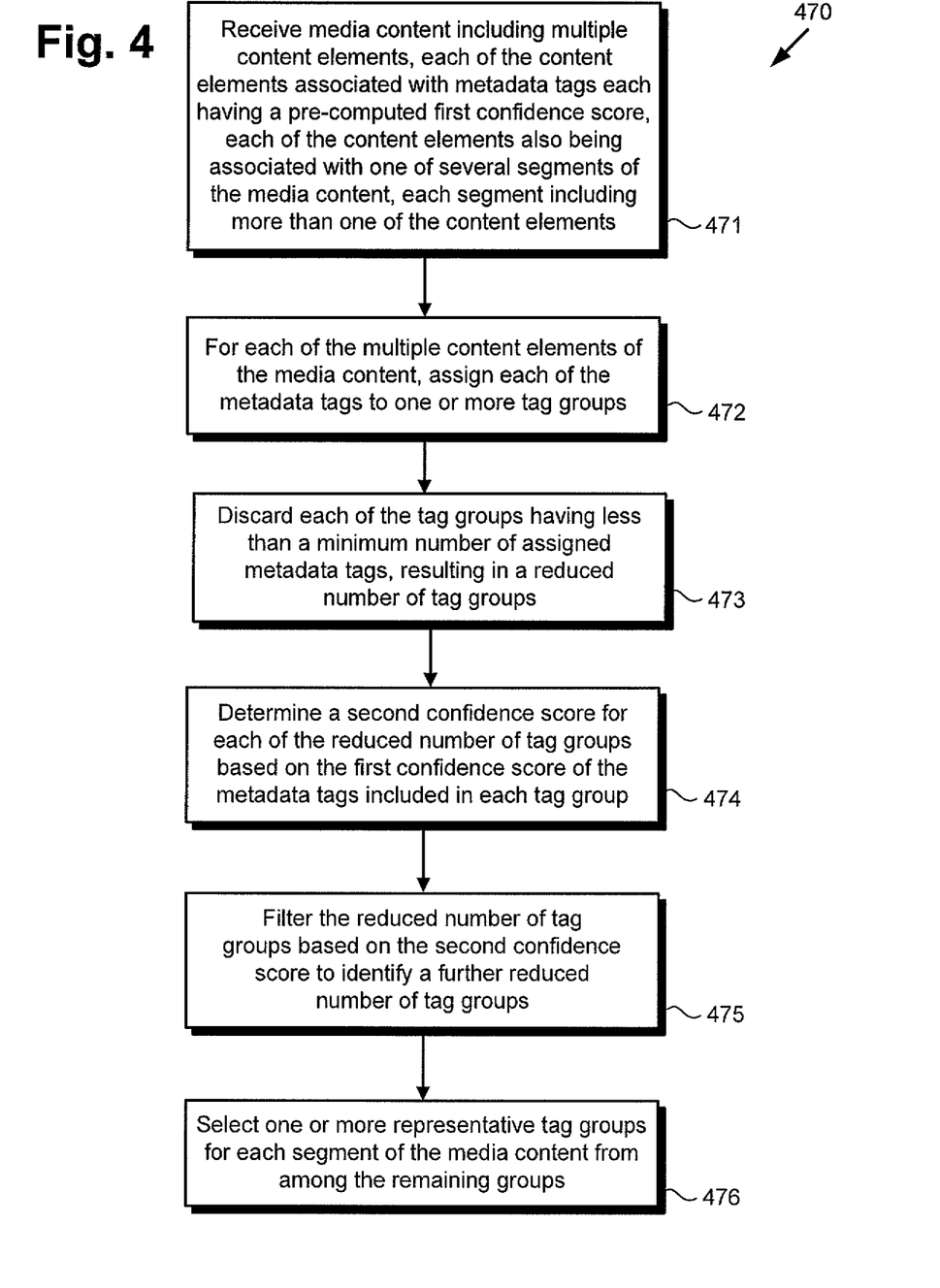
FIG. 4 shows a flowchart presenting an exemplary method for automating media content tag selection, according to one implementation.

The functionality of tag selector software code 110/210*a*/210*b*/310 will be further described by reference to FIG. 4. FIG. 4 shows flowchart 470 presenting an exemplary method for use by a system, such as system 100/150/200/250/360, for automating media content tag selection.

Referring to FIG. 4 in combination with FIGS. 1, 2, and 3, flowchart 470 begins with receiving media content 120 including multiple content elements, each of the multiple content elements being associated with at least some of metadata tags 112*a*-112*n*, each of the multiple content elements also being associated with one of several segments of the media content, each segment including more than one of the multiple content elements (action 471). As shown in FIG. 1, media content 120 received in action 471 includes segments 122 and 126, each of which includes multiple content elements. Nevertheless, for exemplary purposes, the actions of flowchart 470, as well as subsequent flowchart 580, will be described primarily by reference to segment 122 of media content 120, including content elements 124*a* and 124*b*. Media content 120 including segment 122 having content elements 124*a* and 124*b*, as well as segment 126 having content elements 128*a* and 128*b*, may be received by tag selector software code 110/210*a*/210*b*/310, executed by hardware processor 104/204/254/364.

As shown in FIG. 1, in some implementations, media content 120 including segments 122 and 126 may be stored in system memory 106/206/256/366. In those implementations, media content 120 including segments 122 and 126 may be received in a data transfer to tag selector software code 110/210*a*/210*b*/310 within system memory 106/206/256/366. Alternatively, in one implementation, media content 120 including segments 122 and 126 may be received from user 140 via communication network 108 and network communication links 118/218. As yet other alternatives, media content 120 including segments 122 and 126 may be received from a remote media content database, or from a third party source of media content, accessible over communication network 108.

As noted above, segment 122 of media content 120 includes content elements 124*a* and 124*b*, each of which is associated with at least several of metadata tags 112*a*-112*n*. Metadata tags 112*a*-112 *n* may be associated with content elements 124*a* and 124*b* as a result of having been applied to content elements 124*a* and 124*b* in an automated tagging process. For example, where content element 124*a* is a frame of video content, the several of metadata tags 112*a*-112 *n* applied to and associated with content element 124*a* may describe one or more of an object, character, location, or an action depicted in content element 124*a*. Similarly, where content element 124*b* is a frame of video content, the several of metadata tags 112*a*-112 *n* applied to and associated with content element 124*b* may describe one or more of an object, character, location, or an action depicted in content element 124*b*.

Each of the several of metadata tags 112*a*-112 *n* associated with content element 124*a* has a confidence score corresponding to the estimated accuracy of its application to content element 124*a*. Those confidence scores are computed as part of the automated tagging process that associates the several of metadata tags 112*a*-112*n* with content element 124*a* prior to segment 122 of media content 120 being received in action 471. In other words, each of the several of metadata tags 112*a*-112*n* associated with content element 124*a* has a pre-computed confidence score corresponding to the estimated accuracy of its application to content element 124*a*.

Analogously, each of the several of metadata tags 112*a*-112 *n* associated with content element 124*b* has a confidence score corresponding to the estimated accuracy of its application to content element 124*b*. Those confidence scores are computed as part of the automated tagging process that associates the several of metadata tags 112*a*-112 *n* with content element 124*b*. In other words, each of the several of metadata tags 112*a*-112 *n* associated with content element 124b also has a pre-computed confidence score corresponding to the estimated accuracy of its application to content element 124b. It is noted that in instances when a same one of metadata tags 112a-112n, for example, 112b, is associated with content elements 124a and 124b, metadata tag 112b may have one pre-computed confidence score based on its association with content element 124a, and another, different pre-computed confidence score based on its association with content element 124b.

Flowchart 470 continues with, for each of content element of media content 120, assigning each of the several of metadata tags 112a-112 n associated with all content elements to at least one of several tag groups (action 472). This can be done by calculating the correlation of appearance of the metadata tags within the same segment of media content and clustering using the correlation as a distance. For example, each of the several of metadata tags 112a-112 n associated with content element 124a may be assigned to one or more of several tag groups corresponding to one of an object, character, location, or action represented in content element 124a. Those tag groups are shared across all content elements, i.e., a particular tag group "G" can contain metadata tags associated with content elements 124a and 124b. Similarly, each of the several of metadata tags 112a-112 n associated with content element 124b may be assigned to one or more of several tag groups corresponding to one of an object, character, location, or action represented in content element 124b.

As a specific example, a metadata tag identifying a river may be assigned to a tag group also including a metadata tag identifying a stream, as well as another metadata tag identifying a creek, and yet another metadata tag identifying an irrigation channel. In other words, each of the several of metadata tags 112a-112n associated with content element 124a may be assigned to a particular tag group based on similarity of an object, character, location, or action identified by the metadata tags assigned to that particular tag group.

Once again by analogy, each of the several of metadata tags 112a-112n associated with content element 124b may be assigned to a particular tag group based on similarity of an object, character, location, or action identified by the metadata tags assigned to that particular tag group. Assignment of each of the several of metadata tags 112a-112 n associated with each of content elements 124a and 124b to one or more of several tag groups may be performed by tag selector software code 110/210a/210b/310, executed by hardware processor 104/204/254/364.

Flowchart 470 continues with discarding each tag group having less than a minimum number of metadata tags assigned to it, resulting in a reduced number of tag groups (action 473). For example, action 473 may be performed by pruning all tag groups that include a number of metadata tags smaller than N where N can be specified as a function of the richness of the metadata tag categories that the initial automated tagging process provided. As a specific example, if the automated tagging process that provided metadata tags 112a-112 n have four different ways to identify a kitchen and ten different ways to identify a road, a tag group including the metadata tag kitchenette alone will be discarded because we would expect to have other labels in the group such as kitchen given the richness of vocabulary of the source of metadata tags. Discarding of the tag groups having less than the minimum number of metadata tags assigned to it may be performed by tag selector software code 110/210a/210b/310, executed by hardware processor 104/204/254/364.

Flowchart 470 continues with determining a confidence score for each one of the reduced number of tag groups based on the respective pre-computed confidence scores of the metadata tags assigned to that tag group (action 474). For example, where the several of metadata tags 112a-112 n associated with content element 124a are each assigned to one or more of five exemplary tag groups G1, G2, G3, G4, and G5, the confidence score for tag group G1, for example, is based on the pre-computed confidence scores of each metadata tag assigned to tag group G1.

In some implementations, the confidence score for each of the reduced number of tag groups may be based on a sum of the respective pre-computed confidence scores of the metadata tags assigned to that tag group. Thus, for instance, where tag group G1 includes metadata tags 112a, 112c, and 112f, the confidence score for tag group G1 may be determined by summing the individual confidence scores of each of metadata tags 112a, 112c, and 112f as applied to content element 124a. to Determination of the confidence score for each one of the reduced number of tag groups based on the respective pre-computed confidence scores of the metadata tags assigned to that tag group may be performed by tag selector software code 110/210a/210b/310, executed by hardware processor 104/204/254/364.

Flowchart 470 continues with filtering the reduced number of tag groups based on the tag group confidence scores to identify a further reduced number of tag groups (action 475). Returning to the example in which the several of metadata tags 112a-112n associated with content element 124a are each assigned to one or more of tag groups G1, G2, G3, G4, and G5, the filtering of action 474 may result in the discarding of one or more of tag groups G1, G2, G3, G4, or G5, resulting in a further reduced number of tag groups.

In some implementations, the filtering of the reduced number of tag groups of may be performed based on their meeting or failing to meet a threshold confidence score. As a specific example, assume that the respective confidence scores determined for each of tag groups G1, G2, G3, G4, and G5 are filtered by being compared to a predetermined threshold confidence score. Further assuming that the confidence scores of each of tag groups G2, G4, and G5 meets or exceeds the threshold confidence score, while the confidence scores of tag groups G1 and G3 fall below that threshold, action 475 would result in a further reduced number of tag groups, i.e., tag groups G2, G4, and G5. Filtering of the reduced number of tag groups based on their respective tag group confidence scores to identify a further reduced number of tag groups may be performed by tag selector software code 110/210a/210b/310, executed by hardware processor 104/204/254/364.

Flowchart 470 can conclude with selecting one or more representative tag group 132 for each of segments 122 and 126 of media content 120 from among the further reduced number of tag groups remaining after action 475 (action 476). It is noted that actions 472, 473, 474, and 475 serve, in effect, to ensure that the further reduced number of remaining tag describe the content elements of media content 120 substantially accurately. Thus, selection of one or more tag group from the further reduced number of tag groups as representative tag group 132 is a selection process for identifying the most descriptively accurate group of metadata tags 112a-112 n for each segment.

In some implementations, one or more representative tag group 132 for each segment is selected based on how many of the further reduced number of tag groups associated respectively with each of the content elements of the segment include representative tag group 132. For example, in the case of segment 122 of media content 120, where the reduced number of tag groups associated with content element 124a include tag groups G2, G4, and G5, and the reduced number of tag groups associated with content element 124b include tag groups G1 and G4, tag group G4 may be selected as representative tag group 132 of segment 122. That selection of tag group G4 as representative tag group 132 of segment 122 being due to the inclusion of tag group G4 in more than one of the reduced number of tag groups associated respectively with content elements 124a and 124b.

Thus, the method presented by flowchart 470 automates the selection of one or to more tag groups associated with media content elements included in a segment of media content having a coarser level of granularity than the content elements as representative of the segment. As a result, the method presented by flowchart 470 advantageously enables a human quality control annotator such as user 140 to evaluate the accuracy of metadata tags applied to media content at a high level of granularity, i.e., content elements 124a and 124b, based on review of selected metadata tags that are representative of the media content at a coarser level of granularity, i.e., segment 122.

Selection of one or more representative tag group 132 for segment 122 of media content 120 may be performed by tag selector software code 110/210a/210b/310, executed by hardware processor 104/204/254/364. Selection of one or more representative tag group 132 for segment 126 of media content 120 from among the reduced number of tag groups associated respectively with each of content elements 128a and 128b may be analogously performed by tag selector software code 110/210a/210b/310, executed by hardware processor 104/204/254/364.

Figure 5:
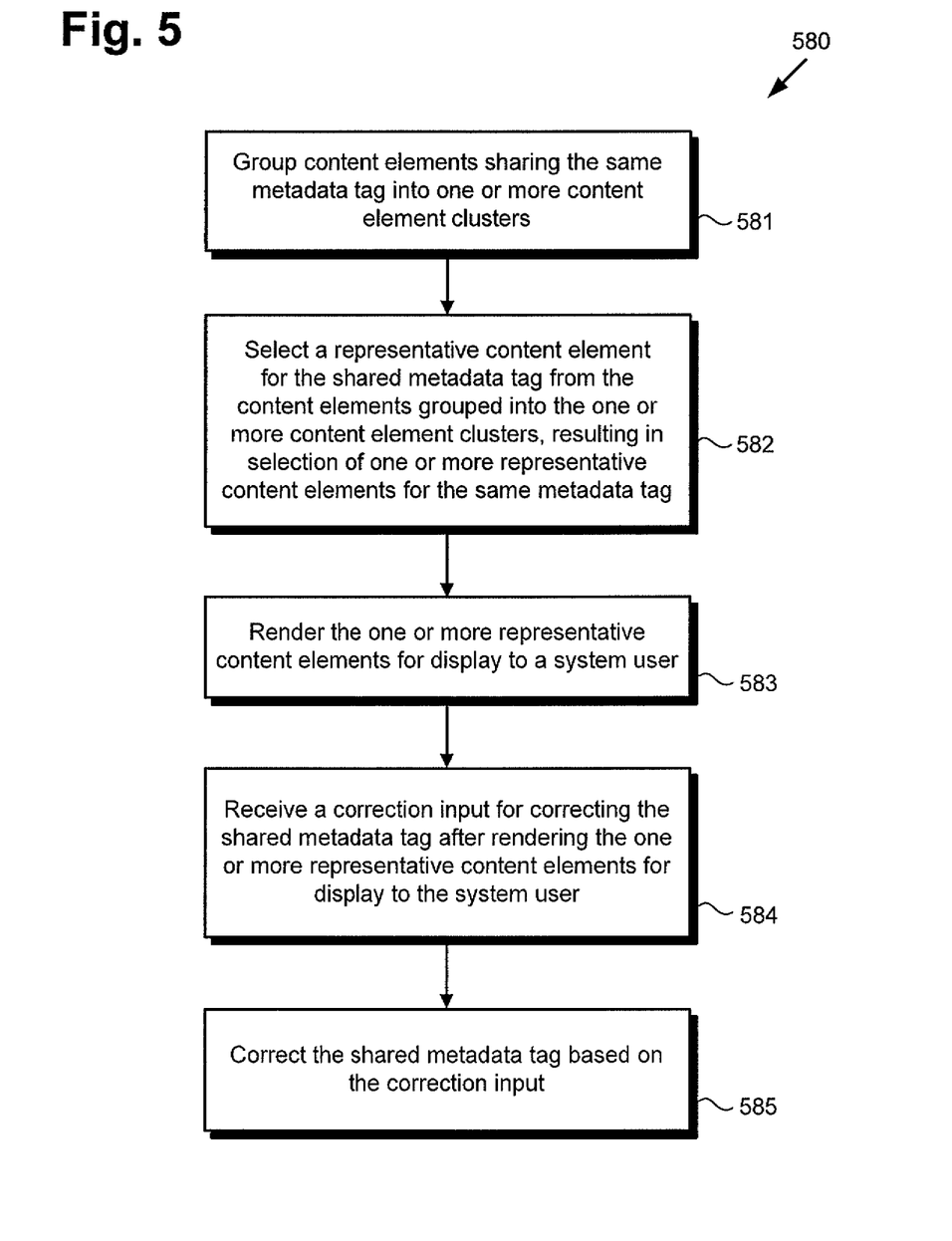
FIG. 5 shows a flowchart presenting an exemplary method for confirming and/or correcting the accuracy of media content tags, according to one implementation.

It is noted that, in some implementations, the automated solution for performing media content tag selection disclosed in the present application may include additional actions related to machine learning. Referring to FIG. 5, FIG. 5 shows flowchart 580 presenting an exemplary method for confirming and/or correcting the accuracy of media content tags, according to one implementation.

Flowchart 580 describes a quality assurance process that may proceed from action 471 of flowchart 470. Flowchart 580 begins with grouping the content elements of media content 120 associated with a same one of metadata tags 112a-112n into one or more content element clusters (action 581).

As noted above, although segments 122 and 126 of media content 120 are each shown to include two media content elements, that representation is provided merely in the interests of conceptual clarity, and more generally, each of segments 122 and 126 may include many more than two content elements. Assuming that media content 120 includes multiple content elements of which content elements 124a and 124b are a subset of two, and that only content elements 124a and 124b share one of metadata tags 112a-112 n in common, e.g., metadata tag 112j, content elements 124a and 124b are grouped in action 581 into a content element cluster in action 581.

Grouping of content elements 124a and 124b into a content element cluster based on their common association with metadata tag 112j may be performed by tag selector software code 110/210a/210b/310, executed by hardware processor 104/204/254/364. An analogous grouping of content elements into content element clusters based on the common association of those grouped content elements with one of metadata tags 112a-112 n may be similarly performed by tag selector software code 110/210a/210b/310, executed by hardware processor 104/204/254/364.

Referring to the content element cluster including content elements 124a and 124b, and metadata tag 112j shared by content elements 124a and 124b, flowchart 580 continues with selecting representative content element 138 for shared metadata tag 112j from among content elements 124a and 124b (action 582). Selection of representative content element 138 may be based on one or more of several criteria. In one implementation, for example, selection of representative content element 138 may include selecting a medoid content element of the content element cluster. Alternatively, selection may be based on the pre-computed confidence score of shared metadata tag 112j with respect to each of content elements 124a and 124b. In this latter implementation, the one of content elements 124a and 124b for which metadata tag 112j has a higher pre-computed confidence score may be selected.

It is noted that in some implementations, the same metadata tag, e.g., metadata tag 112j, may include multiple secondary features. For example, metadata tag 112j may describe a particular character, while secondary features of metadata tag 112j may describe facial expressions of that character, such as smiling, frowning, and the like. In those implementations, the content elements associated with single metadata tag 112j may be grouped into multiple content element clusters corresponding respectively to the secondary features of metadata tag 112j.

Moreover, because more than one content element cluster may correspond to the same metadata tag 112j, action 582 may result in selection of more than one representative content element 138 for the same metadata tag 112j. Selection of one or more representative content element(s) 138 for shared metadata tag 112j may be performed by tag selector software code 110/210a/210b/310, executed by hardware processor 104/204/254/364.

Continuing to refer to metadata tag 112j as the exemplary shared metadata tag represented by one or more representative content element(s) 138, flowchart 580 continues with rendering one or more representative content element(s) 138 for display in combination with shared metadata tag 112j to user 140 of system 100/150/200/250/360 (action 583). Rendering of one or more representative content element(s) 138 in combination with shared metadata tag 112j to user 140 may be performed by tag selector software code 110/210a/210b/310, executed by hardware processor 104/204/254/364, and utilizing display 158/258/368.

Continuing to refer to metadata tag 112j as the exemplary shared metadata tag represented by one or more representative content element(s) 138, flowchart 580 continues with receiving correction input 142 for correcting shared metadata tag 112j after rendering one or more representative content element(s) 138 for display to user 140 (action 584). As shown in FIG. 1, in one implementation, correction input 142 may be received from user system 150, via communication network 108 and network communication links 118/218.

Alternatively, correction input 142 may be received from user 140 via an input interface of user system 150/250 or system 360, such as a keyboard or touchscreen, for example. As yet other alternatives, correction input 142 may be received through crowdsourcing, or a third party automated system, to name merely two additional examples. Correction input 142 for correcting shared metadata tag 112j may be received by tag selector software code 110/210a/210b/310, executed by hardware processor 104/204/254/364.

Continuing to refer metadata tag 112*j* as the exemplary shared metadata tag represented by representative content element 138, flowchart 580 can conclude with correcting shared metadata tag 112*j* based on correction input 142 (action 585). For example, correction input 142 may indicate that shared metadata tag 112*j* corresponds accurately to one or more of one or more representative content element(s) 138, or fails to correspond accurately to one or more of one or more representative content element(s) 138. In use cases in which correction input 142 indicates that shared metadata tag 112*j* fails to correspond accurately to one or more of one or more representative content element(s) 138, correcting shared metadata tag 112*j* may include substituting another metadata tag identified by correction input 142 from among metadata tags 112*a*-112 *n* for representation by one or more of one or more representative content element(s) 138. Correction of shared metadata tag 112*j* based on correction input 142 may be performed by tag selector software code 110/210*a*/210*b*/310, executed by hardware processor 104/204/254/364.

One significant advantage of the methods and systems disclosed by the present application is that tags applied to media content in an automated process can be corrected based on a review of only a subset of the media content elements to which the tag needing correction has been applied. For example, referring to shared metadata tag 112*j* described above, review of one or more representative content element(s) 138 for shared metadata tag 112*g* may be sufficient to correct multiple instances of misapplication of metadata tag 112*g*.

Specifically, where correction input 142 includes identification of another of metadata tags 112*a*-112 *n* as a corrected substitute for shared metadata tag 112*j* as applied to a specific one of one or more representative content element(s) 138, that corrected metadata tag may be applied as a substitute for shared metadata tag 112*j* to all other content elements of the content element cluster for which both metadata tag 112*j* and the specific one of representative content element(s) 138 are shared. Consequently, review of a single one of one or more representative content element(s) 138 can enable correction to tagging by metadata tag 112*j* of all content elements grouped into a common content element cluster.

Moreover, in some implementations, correction input 142 can serve as the basis for correction, by tag selector software code 110/210*a*/210*b*/310 executed by hardware processor 104/204/254/364, of metadata tags other than metadata tag 112*j*. For example, correction input 142 can serve as the basis for correction of other metadata tags included in the further reduced number of tag groups remaining after action 475 of flowchart 470 that also includes metadata tag 112*j*. In other words, in use cases in which one of the tag groups associated with either of content elements 124*a* or 124*b* of segment 122 includes metadata tag 112*j* and other metadata tags, e.g., other metadata tags 112*i* and 112*k*, those other metadata tags 112*i* and 112*k* may also be corrected based on correction input 142 despite not having been individually reviewed by user 140.

Consequently, correction input 142 received by tag selector software code 110/210*a*/210*b*/310 may advantageously be used as training data by tag selector software code 110/210*a*/210*b*/310. Furthermore, tag selector software code 110/210*a*/210*b*/310 may alter its process for automated selection of media content tags based on that training data. In other words, in some implementations, tag selector software code 110/210*a*/210*b*/310 may be configured to learn from correction input 142 in order to improve automated media content tag selection in the future.

Thus, the present application discloses systems and methods for automating media content tag selection. By grouping metadata tags applied to finely grained elements of media content, and filtering the tag groups based on the individual confidence scores of their included metadata tags, the present solution improves the accuracy with which an automated approach to tagging can classify media content elements. Moreover, the present solution automates the selection of one or more tag groups associated with media content elements included in a segment of media content having a coarser level of granularity than the content elements as representative of the segment. Consequently, the present solution advantageously enables a human quality control annotator to evaluate the accuracy of metadata tags applied to media content at a high level of granularity based on review of selected metadata tags that are representative of the media content at a coarser level of granularity.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:
1. A media content tagging system comprising:
a computing platform including a hardware processor and a system memory;
a tag selector software code stored in the system memory;
the hardware processor configured to execute the tag selector software code to:
receive a media content including multiple content elements, each of the multiple content elements being associated with a plurality of metadata tags, each of the plurality of metadata tags having a pre-computed first confidence score, each of the multiple content elements also being associated with one of several segments of the media content, each segment of the several segments of the media content including more than one of the multiple content elements;
for each one of the multiple content elements, assign each of the plurality of metadata tags associated with the one of the multiple content elements to at least one tag group of a first plurality of tag groups of the media content;
discard each tag group of the first plurality of tag groups having less than a minimum number of assigned metadata tags, resulting in a reduced second plurality of tag groups of the media content;
determine a second confidence score for each one of the reduced second plurality of tag groups based on the respective pre-computed first confidence score of each of the plurality of metadata tags assigned to the each one of the reduced second plurality of tag groups;

filter the reduced second plurality of tag groups based on the second confidence score to identify a further reduced third plurality of tag groups;

select at least one representative tag group for each of the several segments of the media content from among the further reduced third plurality of tag groups; and render the at least one representative tag group on a display for a user of the media content tagging system.

2. The media content tagging system of claim 1, wherein the hardware processor is further configured to execute the tag selector software code to:

group content elements of the multiple content elements associated with a same metadata tag into at least one content element cluster;

select a representative content element for the same metadata tag from among the content elements grouped into each of the at least one content element cluster, resulting in selection of at least one representative content element for the same metadata tag; and render the at least one representative content element on the display in combination with the same metadata tag for the user of the media content tagging system.

3. The media content tagging system of claim 2, wherein the same metadata tag includes a plurality of secondary features, and wherein:

the content elements of the multiple content elements associated with the same metadata tag are grouped into a plurality of content element clusters corresponding respectively to the plurality of secondary features of the same metadata tag;

representative content elements for the same metadata tag are selected, respectively, from each of the plurality of content element clusters, resulting in selection of a plurality of representative content elements for the same metadata tag; and the plurality of representative content elements are rendered on the display in combination with the same metadata tag for the user of the media content tagging system.

4. The media content tagging system of claim 2, wherein the hardware processor is further configured to execute the tag selector software code to:

receive a correction input for correcting the same metadata tag after rendering the at least one representative content element on the display for the user of the media content tagging system; and correct the same metadata tag based on the correction input.

5. The media content tagging system of claim 4, wherein the hardware processor is further configured to execute the tag selector software code to correct other metadata tags included in each tag group of the third plurality of tag groups that also includes the same metadata tag, based on the correction input.

6. The media content tagging system of claim 1, wherein each of the plurality of metadata tags associated with the one of the multiple content elements is assigned to the at least one tag group based on similarity of one of an object, character, location, or action identified by the plurality of metadata tags assigned to the at least one tag group.

7. The media content tagging system of claim 1, wherein the second confidence score for each one of the second plurality of tag groups is based on a sum of the respective pre-computed first confidence scores of the plurality of metadata tags assigned to the each one of the second plurality of tag groups.

8. The media content tagging system of claim 1, wherein the media content comprises video content, and the segment is a shot of the video content.

9. The media content tagging system of claim 1, wherein the media content comprises video content, and each of the multiple content elements comprises a frame of the video content.

10. A method being executed by a media tagging system including a computing platform having a hardware processor and a system memory storing a tag selector software code, the method comprising:

receiving, using the hardware processor executing the tag selector software code, a media content including multiple content elements, each of the multiple content elements being associated with a plurality of metadata tags, each of the plurality of metadata tags having a pre-computed first confidence score, each of the multiple content elements also being associated with one of several segments of the media content, each segment of the several segments of the media content including more than one of the multiple content elements;

assigning, for each one of the multiple content elements and using the hardware processor executing the tag selector software code, each of the plurality of metadata tags associated with the one of the multiple content elements to at least one tag group of a first plurality of tag groups of the media content;

discarding, using the hardware processor executing the tag selector software code, each tag group of the first plurality of tag groups having less than a minimum number of assigned metadata tags, resulting in a reduced second plurality of tag groups of the media content;

determining, using the hardware processor executing the tag selector software code, a second confidence score for each one of the reduced second plurality of tag groups based on the respective pre-computed first confidence score of each of the plurality of metadata tags assigned to the each one of the reduced second plurality of tag groups;

filtering, using the hardware processor executing the tag selector software code, the reduced second plurality of tag groups based on the second confidence score to identify a further reduced third plurality of tag groups;

selecting, using the hardware processor executing the tag selector software code, at least one representative tag group for each of the several segments of the media content from among the reduced third plurality of tag groups; and rendering, using the hardware processor executing the tag selector software code, the at least one representative tag group on a display for a user of the media content tagging system.

11. The method of claim 10, further comprising:

grouping, using the hardware processor executing the tag selector software code, content elements of the multiple content elements associated with a same metadata tag into at least one content element cluster;

selecting, using the hardware processor executing the tag selector software code, a representative content element for the same metadata tag from among the content elements grouped into each of the at least one content element cluster, resulting in selection of at least one representative content element for the same metadata tag; and rendering, using the hardware processor executing the tag selector software code, the at least one representative content element on the display in combination with the same metadata tag for the user of the media content tagging system.

12. The method of claim 11, wherein the same metadata tag includes a plurality of secondary features, and wherein:

the content elements of the multiple content elements associated with the same metadata tag are grouped into a plurality of content element clusters corresponding respectively to the plurality of secondary features of the same metadata tag;

representative content elements for the same metadata tag are selected, respectively, from each of the plurality of content element clusters, resulting in selection of a plurality of representative content elements for the same metadata tag; and the plurality of representative content elements are rendered on the display in combination with the same metadata tag for the user of the media content tagging system.

13. The method of claim 11, further comprising:

receiving, using the hardware processor executing the tag selector software code, a correction input for correcting the same metadata tag after rendering the at least one representative content element on the display for the user of the media content tagging system; and correcting, using the hardware processor executing the tag selector software code, the same metadata tag based on the correction input.

14. The method of claim 13, further comprising correcting, using the hardware processor executing the tag selector software code, other metadata tags included in each of the third plurality of tag groups that also includes the same metadata tag, based on the correction input.

15. The method of claim 10, wherein each of the plurality of metadata tags associated with the one of the multiple content elements is assigned to the at least one tag group based on similarity of one of an object, character, location, or action identified by the plurality of metadata tags assigned to the at least one tag group.

16. The method of claim 10, wherein the second confidence score for each one of the second plurality of tag groups is based on a sum of the respective pre-computed first confidence scores of the plurality of metadata tags assigned to the each one of the second plurality of tag groups.

17. The method of claim 10, wherein the media content comprises video content, and the segment is a shot of the video content.

18. The method of claim 10, wherein the media content comprises video content, and each of the multiple content elements comprises a frame of the video content.

* * * * *